United States Patent [19]

Tsujimura et al.

[11] Patent Number: 4,898,499
[45] Date of Patent: Feb. 6, 1990

[54] BALL END MILL

[75] Inventors: Osamu Tsujimura, Kawasaki; Tatsuo Arai, Kitamoto; Masaaki Nakayama, Tokyo; Masayuki Okawa, Kawasaki, all of Japan

[73] Assignee: Mitsubishi Kinzoku Kabushiki Kaisha, Tokyo, Japan

[21] Appl. No.: 164,442

[22] Filed: Mar. 4, 1988

[30] Foreign Application Priority Data

| Mar. 4, 1987 | [JP] | Japan | 62-31257[U] |
| Mar. 19, 1987 | [JP] | Japan | 62-40257[U] |
| Jul. 13, 1987 | [JP] | Japan | 62-107229[U] |
| Jul. 13, 1987 | [JP] | Japan | 62-107230[U] |
| Aug. 5, 1987 | [JP] | Japan | 62-120179[U] |
| Nov. 25, 1987 | [JP] | Japan | 62-179344[U] |
| Nov. 25, 1987 | [JP] | Japan | 62-179343[U] |
| Jan. 26, 1988 | [JP] | Japan | 63-8710[U] |

[51] Int. Cl.$^4$ .............. B23C 5/14; B23C 5/02
[52] U.S. Cl. ...................... 407/42; 407/54; 407/65; 407/113
[58] Field of Search ............ 407/54, 65, 113, 114, 407/42

[56] References Cited

U.S. PATENT DOCUMENTS

| 4,132,493 | 1/1979 | Hosoi | 407/53 |
| 4,251,172 | 2/1981 | Durano | 408/228 |
| 4,411,564 | 10/1983 | Johnson | 407/113 |
| 4,512,689 | 4/1985 | Byluno | 407/40 |
| 4,566,827 | 1/1986 | Neumueller | 407/42 |
| 4,679,968 | 7/1987 | Tsujimura et al. | 407/114 |
| 4,693,641 | 9/1987 | Tsujimura et al. | 407/42 |
| 4,712,949 | 12/1987 | Johnson | 407/42 |

FOREIGN PATENT DOCUMENTS

| 842133 | 7/1960 | United Kingdom | 407/54 |
| 59-15767 | 4/1984 | Japan . | |
| 59-21724 | 5/1984 | Japan . | |
| 5921725 | 5/1984 | Japan . | |
| 61-134812 | 8/1986 | Japan . | |
| 63-57114 | 3/1988 | Japan . | |

Primary Examiner—Frederick R. Schmidt
Assistant Examiner—William E. Terrell
Attorney, Agent, or Firm—Cushman, Darby & Cushman

[57] ABSTRACT

A ball end mill includes an end mill body having an axis of rotation therethrough and an indexable cutter insert releasably attached to a forward end portion of the body. The insert includes a plate having front and rear faces. The front face has at least one generally arcuate first marginal ridge with the first marginal ridge serving as a respective generally arcuate main cutting edge. The front face has at least one short second marginal ridge with the second marginal ridge serving as a respective short cutting edge. The main cutting edge has a leading end portion disposed at one end thereof and intersecting the short cutting edge in such a manner that an angle defined by the leading end portion and the short cutting edge is obtuse. The front face serves as a rake surface for the cutting edges and has a marginal surface portion disposed adjacent to the short cutting edge and the leading end portion. The marginal surface portion is convexly curved so as to slope toward the rear face toward the short cutting edge. The arrangement of the first insert with respect to the body is such that the leading end portion of the main cutting edge is disposed adjacent to the axis of the body, and that the short cutting edge extends from the leading end portion beyond the axis of the body toward the rearward end portion of the body when viewed in a direction generally perpendicular to the front face.

13 Claims, 11 Drawing Sheets

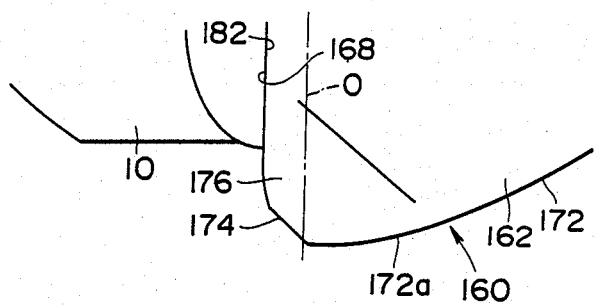
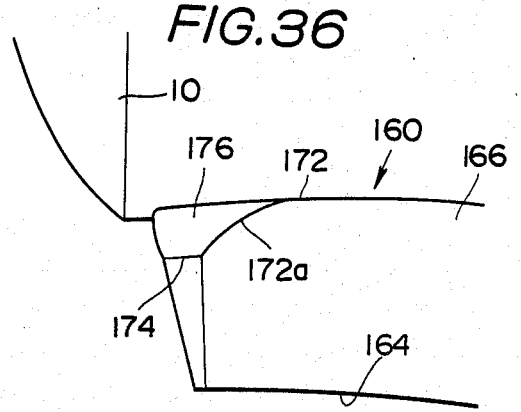
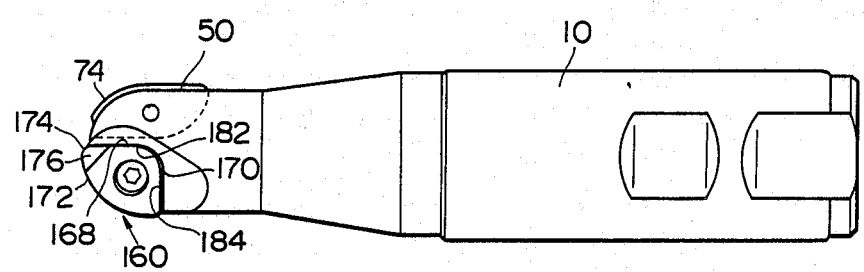

BALL END MILL

BACKGROUND OF THE INVENTION

1. Field of the Invention

The present invention pertains to a ball end mill having at least one cutter insert releasably attached to an end mill body thereof.

2. Prior Art

FIGS. 1 to 3 show one conventional ball end mill as disclosed in Published Examined Japanese patent application No. 59-21725. The end mill comprises a generally cylindrical end mill body 100 and an indexable cutter insert 102 releasably attached to a forward end of the end mill body 100. The insert 102 comprises a plate defined by a front face 104, a rear face 106 and a side periphery lying between the front and rear faces 104 and 106. A pair of opposite notches 108 of a generally V-shape are formed in the side periphery to interrupt the side periphery to provide a pair of opposite side faces 110. Each of the V-shaped notches 108 extends from the front face 104 to the rear face 106 and is defined by a pair of first and second opposed walls 112 and 114. The first wall 112 is flat and perpendicular to the front face 104 while the second wall 114 is convexly curved when viewed in a direction perpendicular to the first wall 112. Each of the side faces 110 assumes a generally quadrantal shape when viewed in a direction perpendicular to the front face 104, and cooperates with the front face 104 and the curved second wall 114 of the notch 108 to define a cutting edge 116 which is convexly arcuate as viewed in the same direction. One of the cutting edges 116 of the insert 102 is indexed in a working position to extend outwardly beyond the front end and outer periphery of the end mill body 100, and the leading end portion 116a of the indexed cutting edge 116 disposed adjacent to an axis O of the end mill body 100 is convexly curved when viewed axially of the end mill body 100.

In the ball end mill described above, the leading end portion 116a of the indexed cutting edge 116 begins to engage a workpiece first, and then other portions of the cutting edge 116 begin to engage the workpiece as the end mill body 100 rotates. Accordingly, the cutting load increases gradually as the cutting operation proceeds, and a great load will not be exerted on the indexed cutting edge 116 at a time, so that the cutting edge 116 is less liable to damage.

In such a prior art ball end mill, however, the flat wall 112 of the V-shaped notch 108 prevents a smooth discharge of chips during the cutting operation and causes the jamming of chips.

SUMMARY OF THE INVENTION

It is therefore an object of the present invention to provide a ball end mill which has a better chip-disposal ability as well as a greater strength in its indexed cutting edge.

According to the present invention, there is provided a ball end mill comprising an end mill body having an axis of rotation therethrough and having forward and rearward end portions; and an indexable first cutter insert releasably attached to the forward end portion of the body, the insert comprising a plate having front and rear faces, the front face having at least one generally arcuate first marginal ridge with the first marginal ridge serving as a respective generally arcuate main cutting edge, the front face having at least one short second marginal ridge with the second marginal ridge serving as a respective short cutting edge, the main cutting edge having a leading end portion disposed at one end thereof and intersecting the short cutting edge in such a manner that an angle defined by the leading end portion and the short cutting edge is obtuse, the front face serving as a rake surface for the cutting edges and having a marginal surface portion disposed adjacent to the short cutting edge and the leading end portion, the marginal surface portion being convexly curved so as to slope toward the rear face toward the short cutting edge; the arrangement of the first insert with respect to the body being such that the leading end portion of the main cutting edge is disposed adjacent to the axis of the body, and that the short cutting edge extends from the leading end portion beyond the axis of the body toward the rearward end portion of the body when viewed in a direction generally perpendicular to the front face.

BRIEF DESCRIPTION OF THE DRAWINGS

FIG. 35 is an enlarged view of a portion of the end mill of FIG. 32 encircled by the character XXXV in FIG. 32;

FIG. 36 is an enlarged view of a portion of the end mill of FIG. 32 encircled by the character XXXVI in FIG. 34;

FIG. 37 is a front elevation of a ball end mill in accordance with a sixth embodiment of the present invention;

DESCRIPTION OF THE PREFERRED EMBODIMENTS OF THE INVENTION

Figure 1:
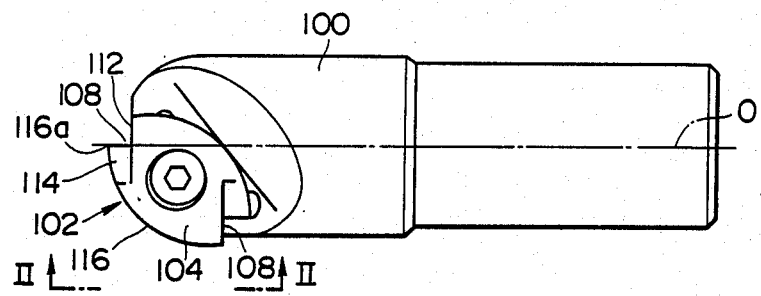
FIG. 1 is a front elevation of a conventional ball end
Figure 2:
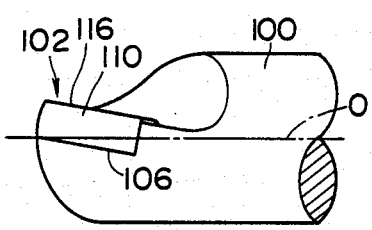
FIG. 2 is a side elevation of a part of the end mill of FIG. 1 as seen in the direction indicated by the arrows II—II in FIG. 1.
Figure 3:
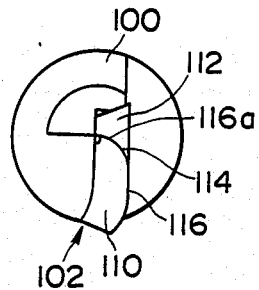
FIG. 3 is an end view of the end mill of FIG. 1.
Figure 4:
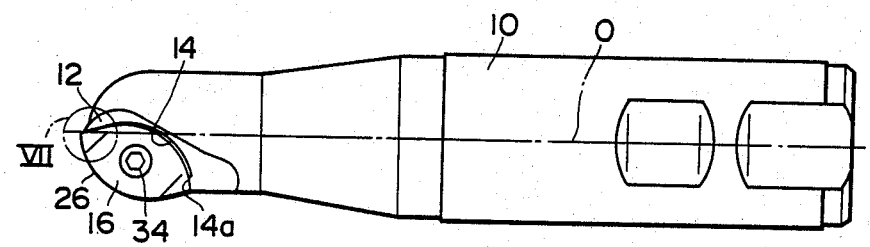
FIG. 4 is a front elevation of a ball end mill in accordance with a first embodiment of the present invention.
Figure 5:
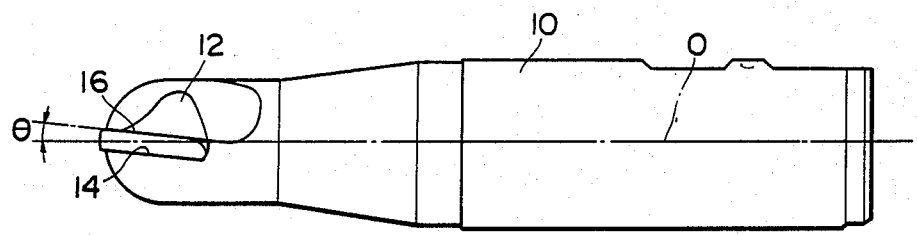
FIG. 5 is a side elevation of the end mill of FIG. 4.

Various embodiments of the present invention will now be described with reference to FIGS. 4 to 49 of the accompanying drawings in which the same reference characters are used to designate like parts or elements in several views.

Referring to FIGS. 4 to 11, a ball end mill in accordance with a first embodiment of the present invention includes a generally cylindrical end mill body 10 having a generally hemispherical forward end portion and a rearward end portion, the rearward end portion being adapted to be fixedly secured to a machine spindle so that the end mill body 10 can be rotated about an axis 0 therethrough. Formed in the forward end portion of the end mill body 10 is a chip pocket 12 which has a wall surface facing in the direction of rotation of the body 10. A recess 14 having a planar bottom surface is formed in the wall surface, and an indexable cutter insert 16 is releasably mounted in the recess 14.

Figure 9:
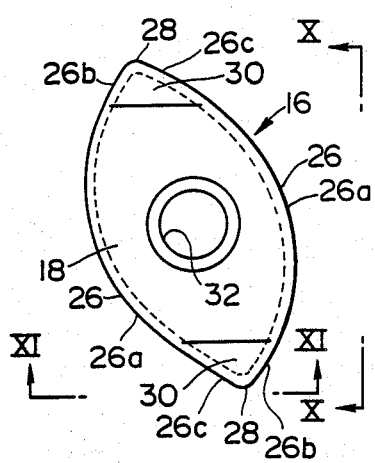
FIG. 9 is a plan view of a cutter insert employed in the end mill of FIG. 4.
Figure 10:
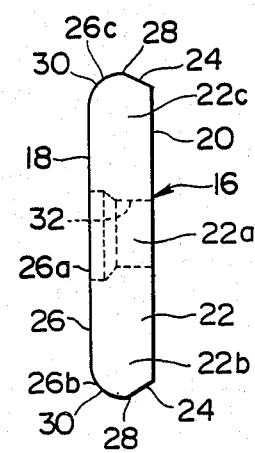
FIG. 10 is a side elevation of the insert of FIG. 9 as seen in the direction indicated by the arrows X—X in FIG. 9.
Figure 11:
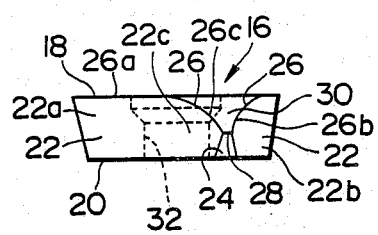
FIG. 11 is another side elevation of the insert of FIG. 9 as seen in the direction indicated by the arrows XI—XI in FIG. 9.
Figure 12:
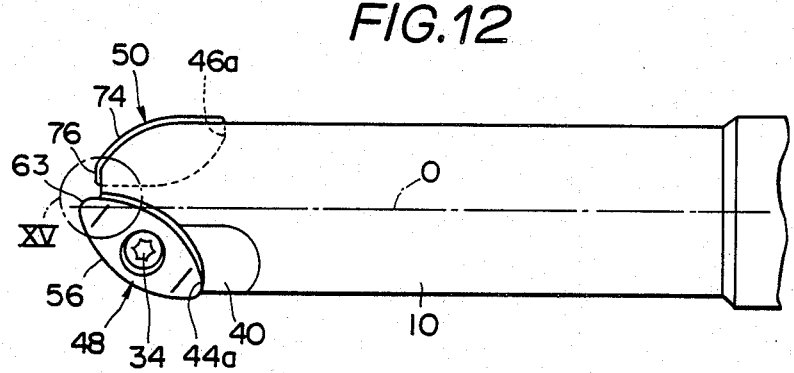
FIG. 12 is a front elevation of a ball end mill in accordance with a second embodiment of the present invention.
Figure 13:
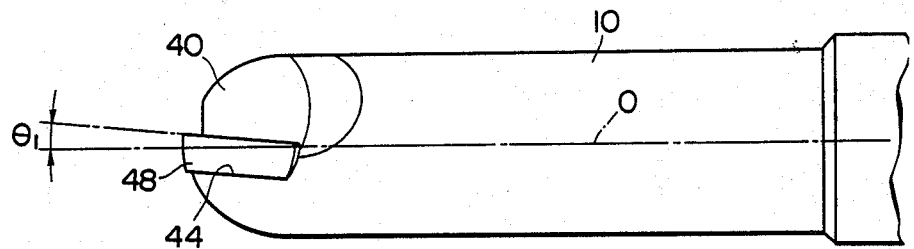
FIG. 13 is a side elevation of the end mill of FIG. 12.

The insert 16, as shown in FIGS. 9 to 11, comprises a plate of a generally elliptical shape defined by a front face 18, a rear face 20 disposed parallel to the front face 18, and two pairs of first and second side faces 22 and 24 disposed alternately and lying between the front and rear faces 18 and 20, each side face being sloping inwardly of the plate in a direction away from the front face 18. The two first side faces 22 as well as the two second side faces 24 are opposed to each other so as to be symmetrical with respect to an axis of the plate or insert. Each first side face 22 is convexly curved so as to assume a quadrantlike shape as viewed in a direction perpendicular to the front face 18, and is comprised of a central arcuate portion 22a and leading and trailing planar portions 22b and 22c disposed at opposite ends of the central portion 22a so as to be tangential to the central portion 22a at the opposite ends, respectively. Each second side face 24 is planar and very short as compared with the first side face 24. Each first side face and each second side face intersects each other so as to define an obtuse angle therebetween. The insert has a pair of convexly curved main cutting edges 26 each defined by the intersection of a respective one of the first side faces 22 with the front face 18, and a pair of short cutting edges 28 each defined by the intersection of a respective one of the second side faces 24 with the front face 18. Each main cutting edge 26 has a leading end where it intersects one of the short cutting edges 28 and also has a trailing end where it intersects the other short cutting edge 28, and is comprised of a central cutting edge portion 26a and leading and trailing end portions 26b and 26c disposed at opposite ends of the central cutting edge portion 26a. And, an angle defined by the short cutting edge 28 and a line tangent to the main cutting edge 26 at its leading end is obtuse.

The front face 18 serves as a rake surface for the cutting edges, and a marginal surface portion 30 thereof disposed adjacent to each short cutting edge 28 and the adjacent leading and trailing end portions 26b and 26c intersecting the short cutting edge 28 is convexly arcuate in such a manner as to slope toward the rear face 20 toward the short cutting edge 28, whereby the leading and trailing end portions 26b and 26c of each main cutting edge 26 are convexly curved as viewed in a side elevation. Besides, since the planar leading and trailing portions 22b and 22c of the first side face 22 is sloping inwardly of the plate in a direction away from the front face 18, the leading and trailing end portions 26b and 26c of the main cutting edge 26 are also convexly curved when viewed in a plan. The insert plate has a central aperture 32 formed therethrough.

Figure 7:
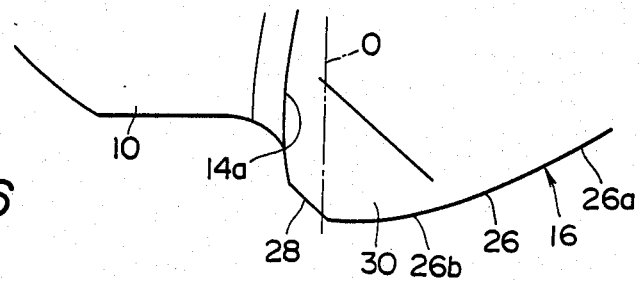
FIG. 7 is an enlarged view of a portion of the end mill of FIG. 4 encircled by the character VII in FIG. 4.
Figure 6:
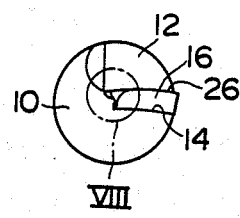
FIG. 6 is an end view of the end mill of FIG. 4.
Figure 8:
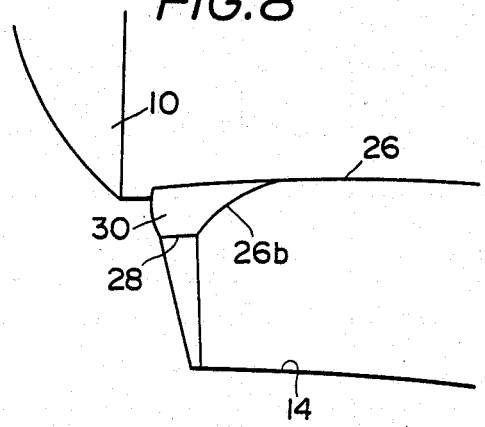
FIG. 8 is an enlarged view of a portion of the end mill of FIG. 4 encircled by the character VIII in FIG. 6.

The insert 16 is received in the recess 14 and releasably secured thereto by a clamp screw 34 passing through the central aperture 32 into the body 10, with the rear face 20 mated with the flat bottom surface of the recess 14, in such a manner that one of the main cutting edges 26 is indexed in a working position so as to extend outwardly slightly beyond the forward end portion of the body 10, and that an axial rake angle $\theta$ for the indexed cutting edge 26 is rendered positive. As best shown in FIG. 7, the leading end portion 26b of the indexed main cutting edge 26 is disposed adjacent to the axis O of the body 10, and the short cutting edge 28 intersecting the indexed main cutting edge 26 at its leading end extends beyond the axis O of the body 10 toward the rearward end portion of the body 10. Further, the insert 16 is placed in position by bringing one pair of the planar leading and trailing portions 22b and 22c into abutment with flat portions 14a formed on the wall surface of the recess 14, respectively.

In the ball end mill described above, since the leading end portion 26b of the main cutting edge 26 is convexly curved as viewed axially of the end mill body 10, the cutting load increases gradually as the cutting operation proceeds, and therefore a great cutting load will not be exerted on the cutting edge 26 at a time. Besides, the insert 16 does not include a wall like the flat wall 112 in the prior art insert 102, and accordingly the ball end mill has a better chip-disposal ability in comparison with the conventional ball end mill. Further, since the angle defined by the short cutting edge 28 and the line tangent to the main cutting edge 26 at its leading end is obtuse, the indexed cutting edge 26 has an increased strength even at its leading end.

FIGS. 12 to 22 show a ball end mill in accordance with a second embodiment of the present invention which differs from the aforementioned end mill in that the end mill body 10 includes a pair of diagonally opposed chip pockets 40 and 42 formed in the generally hemispherical forward end portion thereof and a pair of recesses 44 and 46 formed in the chip pockets 40 and 42, respectively, the recess 44 being disposed adjacent to the axis O of the body 10 while the recess 46 is spaced radially outwardly from the axis O of the body 10. A first cuter insert 48 is received in the recess 44 and releasably secured thereto by the clamp screw 34 while a second cutter insert 50 is received in the recess 46 and releasably secured thereto by a clamp screw (not shown).

Figure 17:
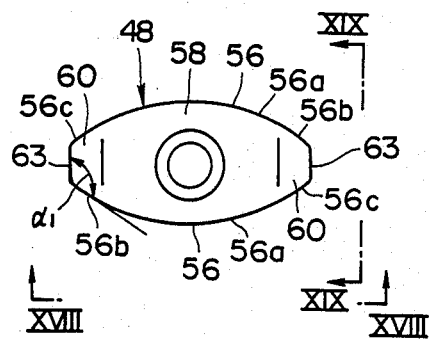
FIG. 17 is a plan view of a first cutter insert attached to an end mill body of the end mill of FIG. 12.
Figure 19:
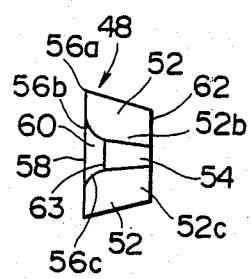
FIG. 19 is another side elevation of the insert of FIG. 17 as seen in the direction indicated by the arrows XIX—XIX in FIG. 17.
Figure 18:
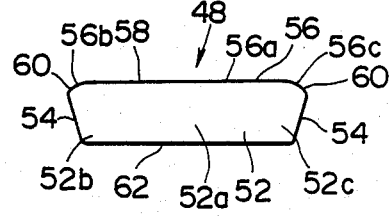
FIG. 18 is a side elevation of the insert of FIG. 17 as seen in the direction indicated by the arrows XVIII—XVIII in FIG. 17.

As shown in FIGS. 17 to 19, the first insert 48 is basically similar in construction to the insert 16 of the first embodiment, but two first side faces 52 are symmetrical with respect to a median plane of the plate or insert extending longitudinally thereof, and two second side faces 54 are symmetrical with respect to a median plane extending transversely thereof. Each first side face 52 is convexly curved so as to assume a quadrantlike shape as viewed in a plan, and is comprised of a central arcuate portion 52a and leading and trailing planar surface portions 52b and 52c disposed at opposite ends of the central portion 52a so as to be tangential to the central portion 52a at the opposite ends. And, a marginal surface portion 60 of a front face 58 disposed adjacent to each second side face 54, which is longer than that of the insert 16 of the first embodiment, is convexly curved in such a manner as to slope toward a rear face 62 toward the second side face 54. With this construction, each main cutting edge 56 is generally arcuately convex as viewed in a direction perpendicular to the front face 58, and is comprised of a central cutting edge portion 56a and leading and trailing end portions 56b and 56c, each end portion being convexly curved not only in a side elevation but also in a plan. And, an angle $\alpha_1$ between the short cutting edge 63 and a line tangent to the main cutting edge 56 at its leading end is obtuse.

Figure 21:
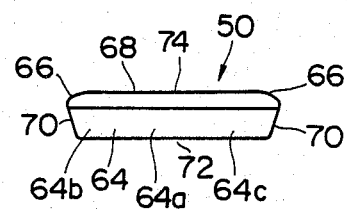
FIG. 21 is a side elevation of the insert of FIG. 20 as seen in the direction indicated by the arrows XXI—XXI in FIG. 20.
Figure 20:
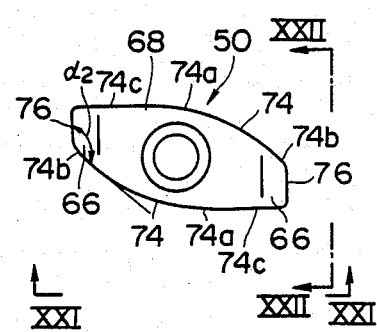
FIG. 20 is a plan view of a second cutter insert attached to the body of the end mill of FIG. 12.
Figure 22:
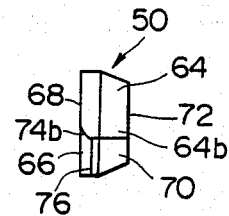
FIG. 22 is another side elevation of the insert of FIG. 20 as seen in the direction indicated by the arrows XXII—XXII in FIG. 20.
Figure 23:
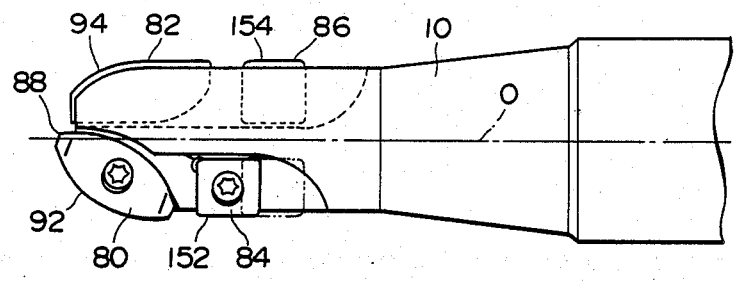
FIG. 23 is a front elevation of a ball end mill in accordance with a third embodiment of the present invention.
Figure 24:
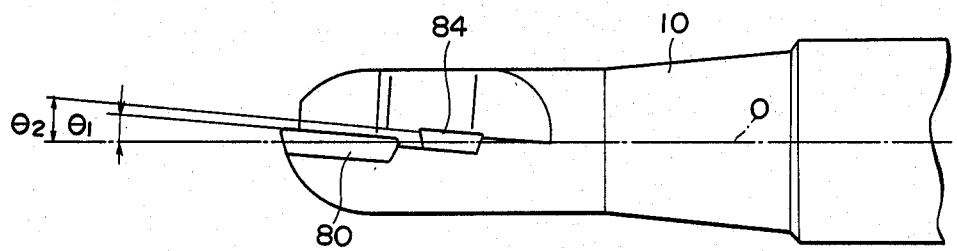
FIG. 24 is a side elevation of the end mill of FIG. 23.
Figure 25:
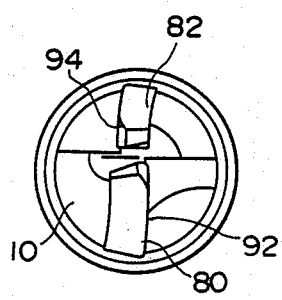
FIG. 25 is an end view of the end mill of FIG. 23.
Figure 26:
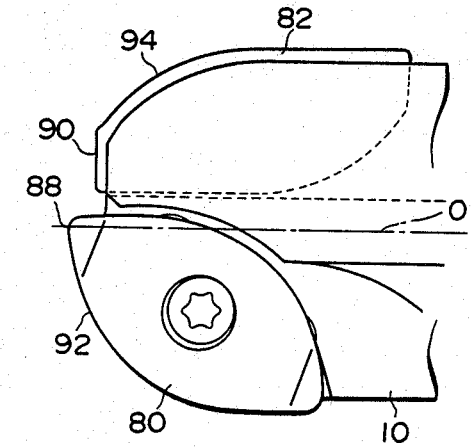
FIG. 26 is an enlarged front elevation of a portion of the end mill of FIG. 23.
Figure 27:
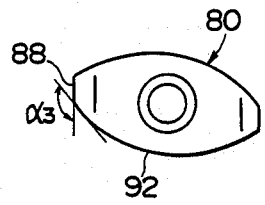
FIG. 27 is a plan view of a first cutter insert attached to an end mill body of the end mill of FIG. 23.
Figure 28:
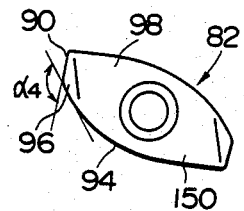
FIG. 28 is a plan view of a second cutter insert attached to the body of the end mill of FIG. 23.

The second insert 50 is, as shown in FIGS. 20 to 22, generally similar in construction to the first insert 48, but includes an opposed pair of side faces 64 each comprised of central and leading portions 64a and 64b defined by an arcuately curved surface and a planar trailing portion 64c extending from the central portion 64a so as to be tangential thereto at its end. In addition, as seen from FIGS. 21 and 22, each side face is defined by an upper portion disposed adjacent to the front face 68 and extending generally perpendicular to the front face 68 and a lower portion sloping inwardly of the insert in a direction away from the front face 68. And, a marginal surface portion 66 of the front face 68 disposed adjacent to each second side face 70 is convexly curved in such a manner as to slope toward a rear face 72 toward the second side face 70. Thus, each main cutting edge 74 is generally arcuately convex as viewed in a direction perpendicular to the front face 68, and is comprised of a central cutting edge portion 74a and leading and trailing end portions 74b and 74c. The central cutting edge portion 74a and the leading end portion 74b are generally arcuately shaped as viewed in a plan while the trailing end portion 74c is straight as viewed in a plan. Further, the leading end portion 74c intersects one of short cutting edges 76 in such a manner as to define an obtuse angle $\alpha_2$ therebetween while the trailing end portion 74c intersects the other short cutting edge 76 in such a manner as to define a generally right angle therebetween.

Figure 15:
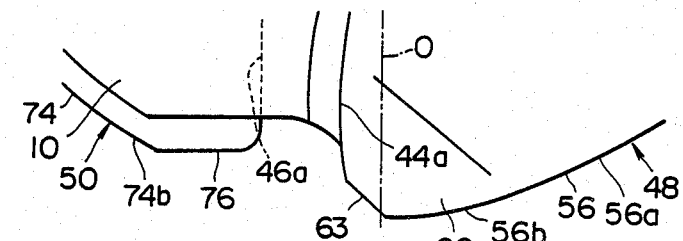
FIG. 15 is an enlarged view of a portion of the end mill of FIG. 12 encircled by the character XV in FIG. 12.
Figure 14:
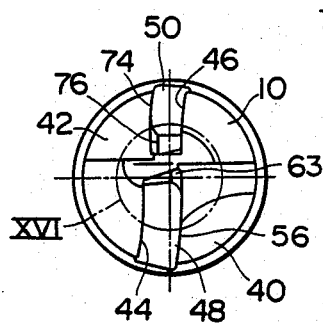
FIG. 14 is an end view of the end mill of FIG. 12.
Figure 16:
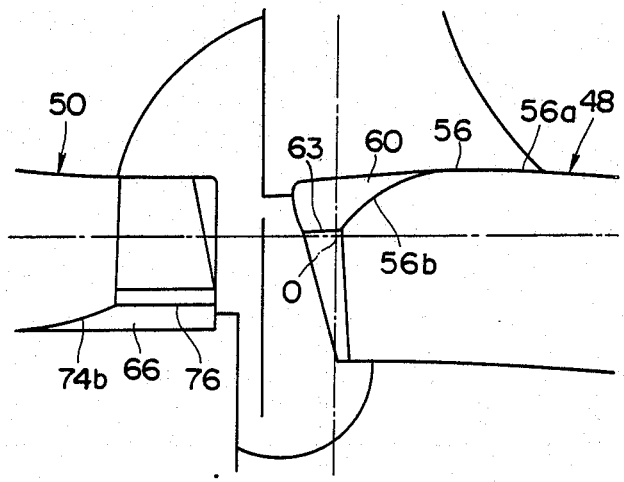
FIG. 16 is an enlarged view of a portion of the end mill of FIG. 12 encircled by the character XVI in FIG. 12.

As is the case with the first embodiment, the first insert 48 is disposed in such a manner that one of the main cutting edges 56 is indexed in a working position, and that an axial rake angle $\theta_1$ for the indexed cutting edge 56 is rendered positive. The leading end portion 56b of the indexed main cutting edge 56 is disposed adjacent to the axis O of the body 10, and the short cutting edge 63 intersecting the indexed main cutting edge 56 at its leading end extends beyond the axis O of the body 10 toward the rearward end portion of the body 10. Further, the recess 44 includes two flat surface portions 44a formed in its wall surface, and the first insert 48 is placed in position by bringing one pair of the planar leading and trailing portions 52b and 52c into abutment with the flat surface portions 44a, respectively. On the other hand, the second insert 50 is received in the recess 46 with the rear face 72 mated with the flat bottom surface of the recess 46, in such a manner that one of the main cutting edges 74 is indexed in a working position so as to extend along the forward end portion of the body 10, and that the axial rake angle for the indexed cutting edge 74 is rendered positive. As best shown in FIGS. 15 and 16, the leading end portion 74b of the indexed main cutting edges 74 is spaced radially outwardly of the body 10 from the axis O of the body 10. As a result, the indexed main and short cutting edges of both the first and second inserts 48 and 50 assume a generally S-shape as a whole when viewed in an end view. Further, the recess 46 includes two flat surface portions 46a formed in its wall surface, and the second insert 50 is placed in position by bringing one planar trailing portions 64c and one second side face 70 into abutment with the flat surface portions 46a, respectively.

In the ball end mill as described above, since the leading end portion 56b of the main cutting edge 56 of the first insert 48 as well as the leading end portion 74a of the main cutting edge 74 of the second insert 50 is convexly curved as viewed in an end view, the cutting load increases gradually as the cutting operation proceeds, and hence a great cutting load will not be exerted on the cutting edge of each insert at a time. Besides, each insert 48, 50 does not include a wall like the flat wall 112 of the prior insert 102, and accordingly the end mill has a better chip-disposal ability. Further, since the angle $\alpha_1$, $\alpha_2$ is obtuse, the indexed main cutting edge 56, 74 has an increased strength even at its leading end.

Further, in this second embodiment, the arrangements of the first and second inserts 48 and 50 may be modified such that when the end mill body 10 is rotated about the axis O of the body 10, the indexed cutting edge 56 of the first insert 48 can generate a generally hemispherical contour having a greater diameter than a generally hemispherical contour which the indexed cutting edge 74 of the second insert 50 can generate. Specifically, the first and second inserts 48 and 50 may be arranged such that the arcuate cutting edge portions 74a and 74b of the main cutting edge 74 of the second insert 50 generate a hemispherical contour with a radius of curvature smaller by, at the most, 0.1 mm than that of the hemispherical contour generated by the main cutting edge 56 of the first insert 48, and that the indexed straight trailing end portion 74c of the main cutting edge 74 of the second insert 50 generates a cylindrical contour with a diameter smaller by, at the most, 0.1 mm than the maximum diameter of the contour generated by the main cutting edge 56 of the first insert 48. With this particular arrangement, the main cutting edge 56 of the first insert 48 mainly participates in the cutting, and therefore a smooth hemispherical recess having no stepped portions formed therein can be obtained, so that such an end mill can be successfully used for a cutting such as dieshinking. As regards the second insert 50, only the part of the straight trailing end portion 74c displaced rearwardly of the body 10 from a point of the cutting edge 56 of the first insert 48 which generates a maximum circular contour mainly participates in the cutting.

FIGS. 23 to 28 show a ball end mill in accordance with a third embodiment of the present invention. In addition to first and second inserts 80 and 82, the end mill includes third and fourth inserts 84 and 86. The first and second inserts 80 and 82 are generally similar in construction to the first and second inserts 48 and 50 in the second embodiment, but in these inserts 80 and 82, angles $\alpha_3$ and $\alpha_4$, each of which is defined by a short cutting edge 88, 90 and a main cutting edge 92, 94 at its leading portion, are greater than the angles $\alpha_1$ and $\alpha_2$ of the first and second inserts 48 and 50 in the second embodiment. Accordingly, the strength of the indexed cutting edge of each insert 80, 82 at its leading end is further improved. Further, in the second insert 82 of this embodiment, a marginal surface portion 96 of a front face 98 disposed adjacent to the short cutting edge 92 is convexly curved in such a manner as to slope toward a rear face 150 toward the leading end portion of the main cutting edge 94 as well as toward the short cutting edge 90, i.e., toward the corner into which the short cutting edge 90 and the leading end portion of the main cutting edge 94 merge. The third and fourth inserts 84 and 86 are of a square shape and are identical in construction to each other. Each of the insert 84 and 86 is releasably attached to the forward end portion of the body 10 in such a manner that one of the cutting edges is indexed in a working position to serve as a respective peripheral cutting edge 152, 154, and that the indexed cutting edges of the third and fourth inserts 84 and 86 and the indexed cutting edges of the first and second inserts 80 and 82 are in series axially of the body as viewed circumferentially of the body 10. An axial rake angle $\theta_2$ for the third and fourth inserts 84 and 86 as well as the axial rake angle $\theta_1$ for the first and second inserts 80 and 82 is set so as to be positive. The provision of such additional inserts 84 and 86 permits the end mill to be employed for a deep cutting operation. Further, in this embodiment, the second insert may be omitted.

Figure 29:
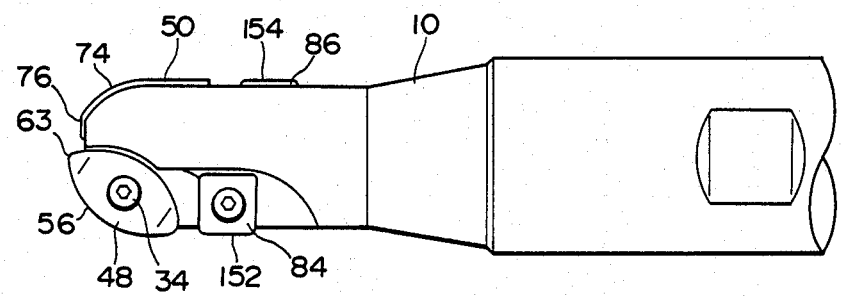
FIG. 29 is a front elevation of a ball end mill in accordance with a fourth embodiment of the present invention.
Figure 30:
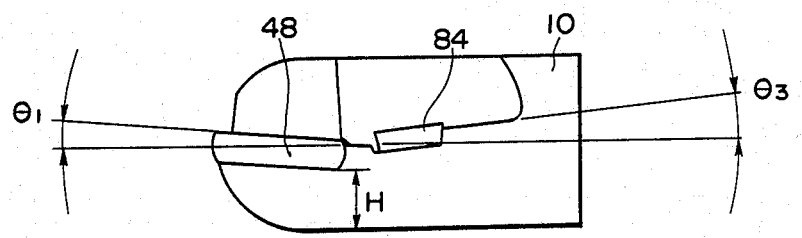
FIG. 30 is a side elevation of a portion of the end mill of FIG. 29.
Figure 31:
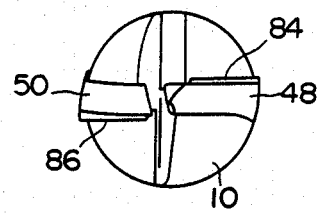
FIG. 31 is an end view of the end mill of FIG. 29.
Figure 34:
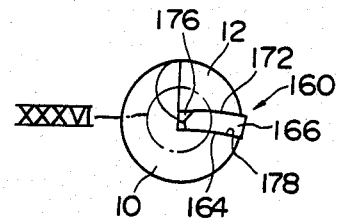
FIG. 34 is an end view of the end mill of FIG. 32.
Figure 32:
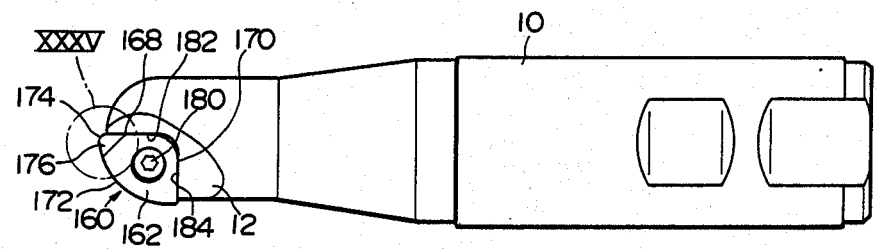
FIG. 32 is a front elevation of a ball end mill in accordance with a fifth embodiment of the present invention.
Figure 33:
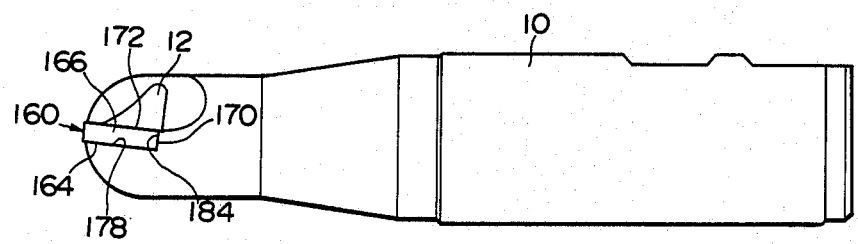
FIG. 33 is a side elevation of the end mill of FIG. 32.

FIGS. 29 to 31 shows a ball end mill in accordance with a fourth embodiment of the present invention which differs from the third embodiment in that the first and second inserts 80 and 82 in the third embodiment are replaced by the first and second inserts 48 and 50 of the second embodiment, and that the third and fourth inserts 84 and 84 are disposed so as to have a negative axial rake angle $\theta_3$ although the axial rake angle $\theta_1$ for the first and second inserts 80 and 82 is still rendered positive. In this embodiment, the direction in which the thrust load is exerted on a workpiece by the third and fourth inserts 84 and 86 is different from the direction in which the thrust load is exerted by the first and second inserts 48 and 50, and therefore those loads are eliminated by each other. As a result, the end mill becomes less susceptible to chattering or vibration during the cutting operation, and hence the surface finish is substantially improved. In the foregoing, the axial rake angle $\theta_1$ for the first and second inserts 80 and 82 should preferably range from 3° to 10° while the axial rake angle $\theta_3$ for the third and fourth inserts 84 and 86 should preferably range from $-10°$ to 0°. If the axial rake angle $\theta_1$ for the first and second inserts 80 and 82 is below 3°, the cutting load is increased substantially. On the other hand, if the axial rake angle $\theta_1$ exceeds 10°, the amount of back metal H in the recessed portion of the forward end portion of the body will be reduced unduly, so that the rigidity of the end mill is lowered. With respect to the axial angle $\theta_3$ of the third and fourth inserts 84 and 86, in the case where it is above 0°, the thrust loads generated by the third and fourth inserts 84 and 86 are not enough to eliminate the thrust loads generated by the first and second inserts. On the other hand, if the angle is less than $-10°$, the cutting loads due to these inserts 84 and 86 become excessive, to thereby adversely affect the cutting performance.

FIGS. 32 to 36 show a ball end mill in accordance with a fifth embodiment of the present invention which includes one cutter insert 160 as is the case with the first embodiment. The insert 160, however, comprises a plate of generally sector shape defined by a front face 162, a rear face 164, an arcuate side face 166 having a quadrantlike shape and first and second planar side faces 168 and 170 intersecting each other so as to define an angle slightly smaller than 90°. A corner where the arcuate side face 166 and the first side face 168 intersect each other is removed to provide a short side face. The insert 160 includes an arcuate cutting edge 172 defined by the front face 162 and the arcuate side face 166, and a short cutting edge 174 defined by the intersection of the front face 162 with the short side face and intersecting the arcuate cutting edge 172 at its leading end so as to define an obtuse angle therebetween. A marginal surface portion 176 of the front face 162 disposed adjacent to the short cutting edge 174 is convexly curved so as to slope toward the short cutting edge 174 toward the rear face 166. And, the insert 160 is received in a recess 178 and releasably secured thereto by a clamp screw 180, in such a manner that the arcuate cutting edge 172 is indexed in a working position so that a leading end portion 172a of the indexed main cutting edge 172 is disposed adjacent to the axis O of the body 10. As is the case with the other embodiments, the short cutting edge 174 extends beyond the axis 0 of the body 10 toward the rearward end portion of the body 10. Further, the recess 178 includes first and second wall surfaces 182 and 184 extending perpendicular to each other, the first wall surface 182 extending axially of the body 10 while the second wall surface 184 extends radially of the body 10. And, the insert 160 is placed in position by bringing the first and second planar side faces 168 and 170 into abutment with the first and second wall surfaces 182 and 184, respectively. With such construction, since the insert 160 is held between the two wall surfaces 182 and 184 intersecting perpendicular to each other, the insert 160 is positively prevented from being shifted during the cutting operation, so that the accuracy of the cutting can be further improved.

Figure 38:
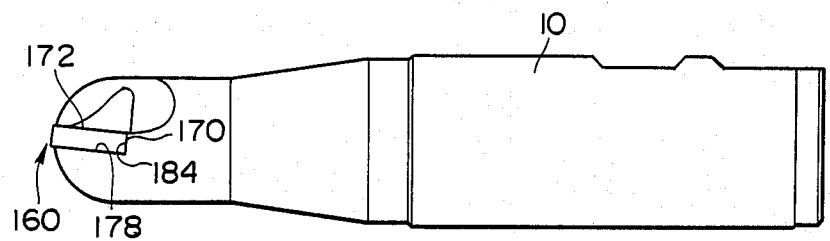
FIG. 38 is a side elevation of the end mill of FIG. 37.
Figure 39:
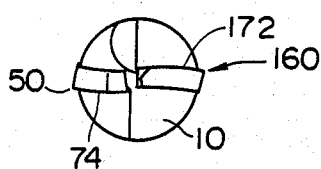
FIG. 39 is an end view of the end mill of FIG. 37.

FIGS. 37 to 39 show a ball end mill in accordance with a sixth embodiment which differs from the fifth embodiment only in that the second insert 50 of a generally elliptical shape is added as is the case with the second embodiment.

Figure 42:
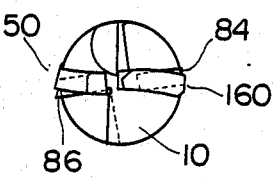
FIG. 42 is an end view of the end mill of FIG. 40.
Figure 40:
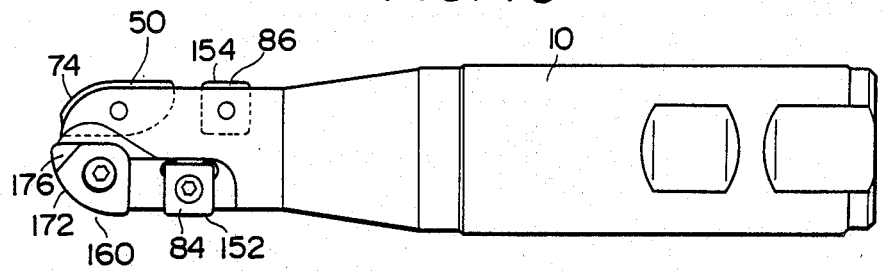
FIG. 40 is a front elevation of a ball end mill in accordance with a seventh embodiment of the present invention.
Figure 41:
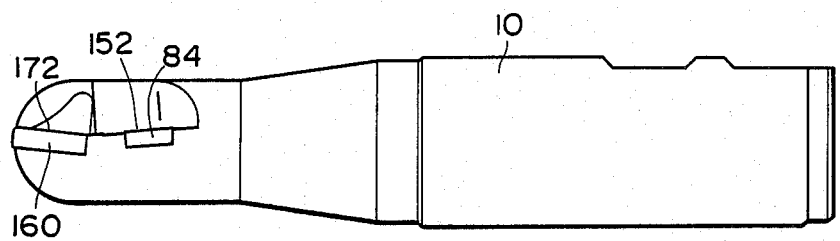
FIG. 41 is a side elevation of the end mill of FIG. 40.
Figure 43:
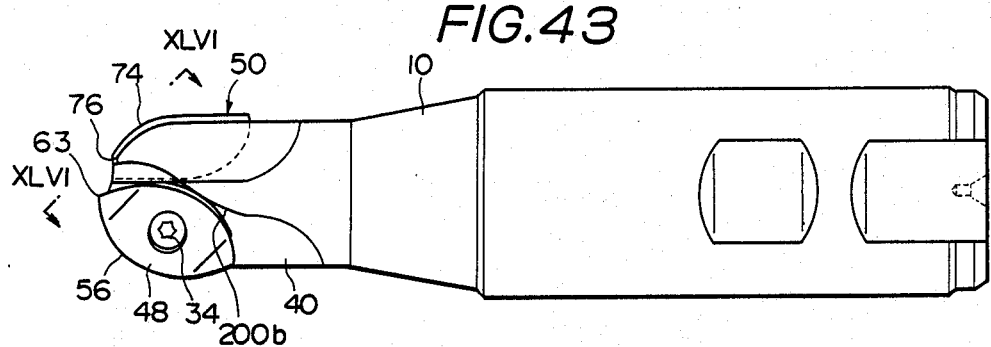
FIG. 43 is a front elevation of a ball end mill in accordance with an eighth embodiment of the present invention.

FIGS. 40 to 42 show a ball end mill in accordance with a seventh embodiment of the present invention which differs from the sixth embodiment in that, as is the case with the fourth embodiment, the third and fourth inserts 84 and 86 of a square shape are additionally attached to the body to permit the end mill to be used for the deep cutting operation.

Figure 44:
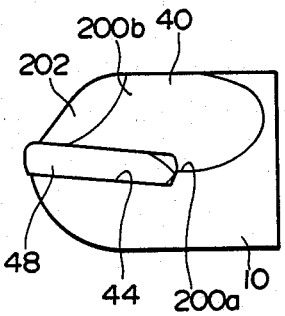
FIG. 44 is a side elevation of a portion of the end mill of FIG. 43.
Figure 45:
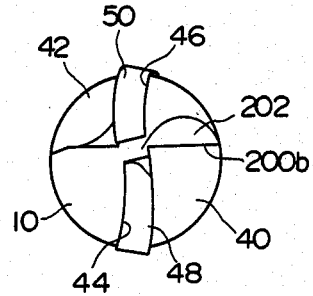
FIG. 45 is an end view of the end mill of FIG. 43.
Figure 46:
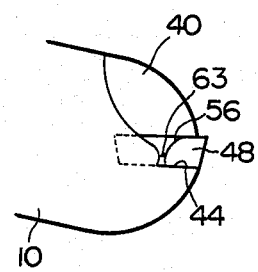
FIG. 46 is a view of the end mill of FIG. 43 as seen in the direction indicated by the arrows XLVI—XLVI in FIG. 43.

FIGS. 43 to 46 show a ball end mill in accordance with an eighth embodiment of the present invention which is generally similar to the second embodiment. The chip pocket 40 for the first insert 48 includes a first wall portion 200a in which the recess 44 is formed and a second wall portion 200b facing in a direction opposite to the direction of rotation of the body 10. As best shown in FIG. 44, the second wall portion 200b of the chip pocket 40 includes a forward inclined portion 202 formed therein and sloping forwardly of the body 10 in the direction of rotation of the body 10. With this construction, chips produced during the cutting operation are guided smoothly along the forward inclined portion 202, and therefore the chip-disposal ability can be improved substantially.

Figure 47:
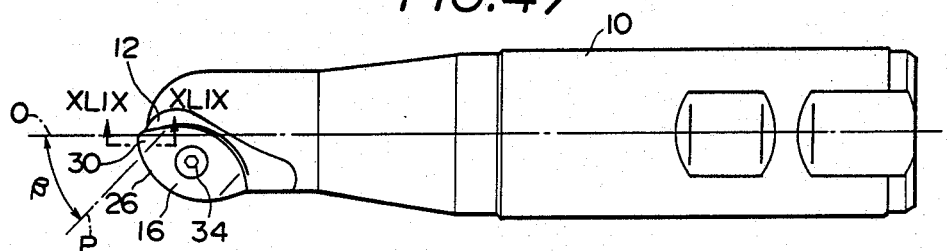
FIG. 47 is a front elevation of a ball end mill in accordance with a ninth embodiment of the present invention.
Figure 48:
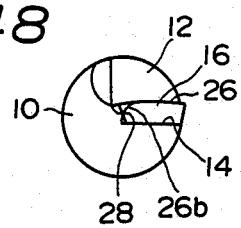
FIG. 48 is an end view of the end mill of FIG. 47.
Figure 49:
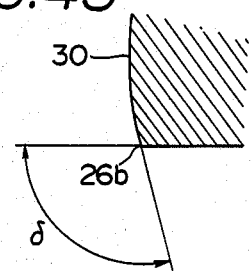
FIG. 49 is a cross-sectional view taken along the line XLIX—XLIX in FIG. 47.

FIGS. 47 to 49 show a ball end mill in accordance with a ninth embodiment of the present invention which is generally similar in construction to the first embodiment. In this embodiment, however, the convexly curved marginal surface portion 30 is defined by a cylindrical surface, and the disposition of the insert 16 is modified. Specifically, the insert 16 is disposed in such a manner that an axis P of a cylinder defining the above cylindrical surface is inclined at an inclination angle $\beta$ of between 15° and 50° with respect to the axis O of the end mill body 10 when viewed in a direction perpendicular to a reference plane (Japanese Industrial Standard B0170; No. 204) for the indexed cutting edge 26. The reference plane is defined as a plane perpendicular to the direction of the primary motion of the indexed cutting edge 26. If the inclination angle is less than 15°, the included angle $\delta$ at the convex lead end portion 26b of the main cutting edge 26 is reduced unduly, so that the cutting edge becomes susceptible to damage. On the other hand, if the angle exceeds 50°, the accuracy of the cutting is lowered, and besides the cutting load is increased suddenly.

The merits of the present embodiment will be illustrated in detail with reference to the following example.

Specifically, there were prepared two ball end mills each having an outer diameter of 25 mm$\phi$ and having a cutter insert with a thickness of 4 mm, and the inclination angles $\beta$ for the convexly curved surface portions and the relief angles $\gamma$ for the insert were varied to verify the influence of those angles on the accuracy of the cutting, i.e., the sphericity of the bottom portion of the recess processed by the end mill. In one of the end mills, which will be hereinafter referred to as SAMPLE No. 1, the axial rake angle for the insert was set to be 5° while in the other end mill, which will be referred to as SAMPLE No. 2, the axial rake angle was set to be 10°. Then, as to such ball end mills, the deviations of the hemispherical contour to be generated by the convexly curved leading end portion of the cutting edge from a hemispherical contour to be generated by the arcuate cutting edge portion were obtained by calculation. The results are shown in TABLE 1 in which the plus values mean that the contour generated by the leading end portion of the cutting edge is excluded from the contour generated by the arcuate cutting edge portion while the minus values mean that the contour generated by the leading end portion is contained in the contour generated by the arcuate cutting edge portion. In this example, the insert was such that the axis of the convex surface portion passed through the corner into which the arcuate surface portion and the planar surface portion merge.

TABLE 1

| Samples | $\beta$ / $\gamma$ | 0 | 15 | 30 | 45 | 60 |
| --- | --- | --- | --- | --- | --- | --- |
| No. 1 | 11 | 0 to +9.2 | −1.5 to 0 | −2.9 to 0 | 0 to +7.7 | 0 to +40.3 |
|  | 15 | 0 to +13.5 | −1.8 to 0 | −7.2 to 0 | −3.9 to 0 | 0 to +24 |
| No. 2 | 11 | 0 to +3.8 | −2.5 to 0 | −0.8 to +1.1 | 0 to +17 | 0 to +60 |
|  | 15 | 0 to +7.6 | −4.8 to 0 | −5.7 to 0 | 0 to +5 | 0 to +41 |

(unit: $\mu$m)

As seen from Table 1, if the inclination angle is 60°, then the deviations abruptly becomes excessive, and hence the accuracy is lowered. Incidentally, the deviations acceptable for the ball end mills of this kid are usually within the range of ±20 $\mu$m. In the end mills of the present invention, however, since the inclination angle is set to be within the range of between 15° and 50°, the strength of the cutting edge and the chip-disposal ability are further improved, and a high accuracy can be attained. Further, in the case where the inclination angle exceeds 60°, the deviations could not be reduced within the range of ±20 $\mu$m no matter how the compensation was made as to the curvature of the marginal convex surface portion.

Obviously many modifications and variations of the present invention are possible in the light of the above teachings. It is therefore to be understood that within the scope of the appended claims, the invention may be practiced otherwise than as specifically described.

What is claimed is:

1. A ball end mill comprising:
   an end mill body having an axis of rotation therethrough and having forward and rearward end portions; and
   an indexable first cutter insert releasably attached to said forward end portion of said body, said insert comprising a plate having front and rear faces, said front face having at least one generally arcuate first marginal ridge with said first marginal ridge serving as a respective generally arcuate main cutting edge, said front face having at least one short second marginal ridge with said second marginal ridge serving as a respective short cutting edge, said main cutting edge having a leading end portion disposed at one end thereof and intersecting said short cutting edge in such a manner that an angle defined by said leading end portion and said short cutting edge is obtuse, said front face serving as a rake surface for said cutting edges and having a marginal surface portion disposed adjacent to said short cutting edge and said leading end portion, said marginal surface portion being convexly curved so as to slope toward said rear face toward said short cutting edge;

the arrangement of said first insert with respect to said body being such that said leading end portion of said main cutting edge is disposed adjacent to said axis of said body, and that said short cutting edge extends from said leading end portion beyond said axis of said body toward said rearward end portion of said body when viewed in a direction generally perpendicular to said front face;

said ball end mill further comprising at least one indexable peripheral cutter insert having at least one cutting edge and releasably attached to said body so as to be spaced from said first insert rearwardly of said body, said peripheral insert being disposed in such a manner that said at least one cutting edge is indexed in a peripheral cutting position to serve as a peripheral cutting edge, and that said cutting edge serving as said peripheral cutting edge and said indexed cutting edges of said first insert are in series axially of said body as viewed circumferentially of said body.

2. A ball end mill comprising:

an end mill body having an axis of rotation therethrough and having forward and rearward end portions; and first and second indexable cutter inserts each releasably attached to said forward end portion of said body, each insert comprising a plate having front and rear faces, said front face having at least one generally arcuate first marginal ridge with said first marginal ridge serving as a respective generally arcuate main cutting edge, said front face having at least one short second marginal ridge with said second marginal ridge serving as a respective short cutting edge, said main cutting edge having a leading end portion disposed at one end thereof and intersecting said short cutting edge in such a manner that an angle defined by said leading end portion and said short cutting edge is obtuse, said front face serving as a rake surface for said cutting edges and having a marginal surface portion disposed adjacent to said short cutting edge and said leading end portion, said marginal surface portion being convexly curved so as to slope toward said rear face toward said short cutting edge;

the arrangement of said first insert with respect to said body being such that said leading end portion of said main cutting edge is disposed adjacent to said axis of said body, and that said short cutting edge of said first insert extends from said leading end portion beyond said axis of said body toward said rearward end portion of said body when viewed in a direction generally perpendicular to said front face, the arrangement of said second insert with respect to said body being such that said leading end portion is spaced radially outwardly of said body from said axis of said body.

3. A ball end mill comprising:

an end mill body having an axis of rotation therethrough and having forward and rearward end portions; and an indexable first cutter insert releasably attached to said forward end portion of said body, said insert comprising a plate defined by a front face, a rear face and a plurality of pairs of first and second side faces disposed alternately and lying between said front face and said rear face, each of said first side faces cooperating with said front face to define a main cutting edge which is generally arcuately shaped when viewed in a direction perpendicular to said front face, each of said second side faces cooperating with said front face to define a secondary cutting edge, said secondary cutting edges being shorter than said main cutting edges, each of said main cutting edges having a leading end portion which intersects one of said secondary cutting edges at an obtuse angle and a trailing end portion which intersects the another of the secondary cutting edges, said front face serving as a rake surface for said main and secondary cutting edges and having a pair of marginal surface portions each disposed between the leading end portion of one of said main cutting edges and the trailing end portion of the other main cutting edge, said marginal surface portion being convexly curved so as to slope toward said rear face toward said secondary cutting edge;

the arrangement of said first insert with respect to said body being such that said leading end portion of said main cutting edge is disposed adjacent to said axis of said body, and that said secondary cutting edge extends from said leading end portion beyond said axis of said body toward said rearward end portion of said body when viewed in a direction generally perpendicular to said front face so that said secondary cutting edge lies substantially opposite said axis from said main cutting edge.

4. A ball end mill according to claim 2, further comprising at least one indexable peripheral cutter insert having at least one cutting edge and releasably attached to said body so as to be spaced from said first and second inserts rearwardly of said body, said peripheral insert being disposed in such a manner that said at least one cutting edge is indexed in a peripheral cutting position to serve as a peripheral cutting edge, and that said cutting edge serving as said peripheral cutting edge and said indexed cutting edges of said first and second inserts are in series axially of said body as viewed circumferentially of said body.

5. A ball end mill according to claim 4, in which an axial rake angle for said first and second inserts is rendered positive while an axial rake angle for said at least one peripheral insert is set so as to be not greater than 0°.

6. A ball end mill according to claim 5, in which the axial rake angle for said first and second inserts ranges from 3° to 10° while the axial rake angle for said at least one peripheral insert ranges from −10° to 0°.

7. A ball end mill according to claim 2, in which the arrangements of said first and second inserts are such that when said body is rotated about said axis of said body, said main cutting edge of said first insert generates a generally hemispherically shaped contour having a diameter greater than a generally hemispherically shaped contour which said main cutting edge of said second insert generates.

8. A ball end mill according to claim 3 or claim 2, in which said plate of said insert is of a generally elliptical shape and is defined by said front and rear faces and two pairs of first and second side faces disposed alternately and lying between said front and rear faces, each first side face cooperating with said front face to define said main cutting edge while each second side face cooperates with said front face to define said short cutting edge.

9. A ball end mill according to claim 1 or claim 3, in which said forward end portion of said body includes a recess defined by a bottom and a wall surface, said wall surface having a flat surface portion; said plate of said first cutter insert being of a generally sector shape and defined by said front and rear faces, a generally arcuate side face, and first and second planar side faces intersecting each other so as to define an angle smaller than 90° therebetween, said plate having a corner where said arcuate side face intersects said first side face, said corner being removed to provide a third planar side face, said arcuate side face cooperating with said front face to define said main cutting edge while said third side face cooperates with said front face to define said short cutting edge, said first insert being received in said recess with said second side face mated with said flat surface portion of said wall surface.

10. A ball end mill according to claim 2 or claim 4, in which said forward end portion of said body includes a recess defined by a bottom and a wall surface, said wall surface having a flat surface portion; said plate of said first cutter insert being of a generally sector shape and defined by said front and rear faces, a generally arcuate side face, and first and second planar side faces intersecting each other so as to define an angle smaller than 90° therebetween, said plate having a corner where said arcuate side face intersects said first side face, said corner being removed to provide a third planar side face, said arcuate side face cooperating with said front face to define said main cutting edge while said third side face cooperates with said front face to define said short cutting edge, said first insert being received in said recess with said second side face mated with said flat surface portion of said wall surface; said plate of said second insert being of a generally elliptical shape and defined by said front and rear faces and two pairs of first and second side faces disposed alternately and lying between said front and rear faces, each first side face of said second insert cooperating with said front face to define said main cutting edge while each second side face of said second insert cooperates with said front face to define said short cutting edge.

11. A ball end mill according to claim 3 or claim 2, in which said marginal surface portion of said insert is defined by a part of the surface of a cylinder.

12. A ball end mill according to claim 11, in which the disposition of said first insert is such that an axis of said cylinder is inclined at an inclination angle of between 15° and 50° with respect to said axis of said body when viewed in a direction perpendicular to a reference plane (Japanese Industrial Standard B0170; No. 204) for said indexed main cutting edge.

13. A ball end mill according to claim 3 or claim 2, in which said forward end portion of said body includes a chip pocket formed therein having a first wall portion facing in a direction of rotation of said body and a second wall portion facing in a direction opposite to the direction of rotation of said body, said first wall portion of said chip pocket having a recess in which said first insert is received, said second wall portion including a forward surface portion sloping forwardly of said body in the direction of rotation of said body.

* * * * *